United States Patent
Madhusudana et al.

(10) Patent No.: US 8,856,395 B2
(45) Date of Patent: Oct. 7, 2014

(54) LOCALIZED DEVICE MISSING DELAY TIMERS IN SAS/SATA TOPOLOGY

(75) Inventors: Naresh Madhusudana, Bangalore (IN); Prashant Prakash Yendigiri, Bangalore (IN); Darshana Lingadahalli Chandrashekarappa, Bangalore (IN)

(73) Assignee: LSI Corporation, San Jose, CA (US)

( * ) Notice: Subject to any disclaimer, the term of this patent is extended or adjusted under 35 U.S.C. 154(b) by 57 days.

(21) Appl. No.: 13/572,763

(22) Filed: Aug. 13, 2012

(65) Prior Publication Data

US 2014/0047136 A1  Feb. 13, 2014

(51) Int. Cl.
*G06F 3/00* (2006.01)
*G06F 13/14* (2006.01)

(52) U.S. Cl.
USPC .......................................................... 710/15

(58) Field of Classification Search
USPC ............................................................ 710/15
See application file for complete search history.

(56) References Cited

U.S. PATENT DOCUMENTS

| | | | |
|---|---|---|---|
| 6,115,459 A * | 9/2000 | Wakabayashi | 379/156 |
| 7,673,185 B2 | 3/2010 | Kalwitz et al. | |
| 2008/0130532 A1* | 6/2008 | Maenpaa | 370/310 |
| 2008/0239990 A1* | 10/2008 | Ohara | 370/254 |
| 2011/0320708 A1* | 12/2011 | Otaka et al. | 711/114 |

* cited by examiner

*Primary Examiner* — Henry Tsai
*Assistant Examiner* — Dean Phan
(74) *Attorney, Agent, or Firm* — Suiter Swantz pc llo (57) ABSTRACT

A SAS expander includes DMD timers for each PHY so that the expander can track disconnected devices directly connected to the expander and signal a SAS controller when the DMD is exceeded. A system including such SAS expanders may reduce the load on the system controller. A controller may recognize expanders capable of tracking DMDs for backwards compatibility.

8 Claims, 13 Drawing Sheets

LOCALIZED DEVICE MISSING DELAY TIMERS IN SAS/SATA TOPOLOGY

FIELD OF THE INVENTION

The present invention is directed generally toward network topology and more particularly toward expanders and controllers having Device Missing Delay timers.

BACKGROUND OF THE INVENTION

When devices are removed from a SAS/SATA topology, there will be a lot of processing to handle the removed device. In a storage topology, devices may be disconnected and added back in a short period of time. In such cases, to avoid unnecessary processing of devices, controllers may include Device Missing Delay (DMD) timers. If a device goes missing and comes back within the DMD period the device would not be considered removed; instead minimal corrective action would be taken and normal operation may continue.

The DMD feature is essential for storage products and is necessary to handle common error scenarios. As the topology size increases the system resources to maintain DMD timers in the controller also increases. At the same time the computation time for handling DMD timers also increases. Therefore, as topology size increases, the solution cost increases and controller performance decreases.

Furthermore, when a device comes back within the DMD but, due to controller processing delay, the device may continue to be considered missing. The sequence of operation in the controller becomes very important in deciding the proper functionality of the DMD feature, hence making it very implementation specific. Since DMDs are handled in the controller, only one delay value is used for the entire topology, therefore it is not possible to set different DMD values for different parts of topology.

Consequently, it would be advantageous if an apparatus existed that is suitable for distributing the load of multiple DMD timers throughout a topology.

SUMMARY OF THE INVENTION

Accordingly, the present invention is directed to a novel method and apparatus for distributing the load of multiple DMD timers throughout a topology.

In one embodiment of the present invention, an expander in a SAS/SATA topology may include one or more DMD timers, reducing the overhead of the controller. The expander may operate DMD timers for devices directly connected to the expander.

In another embodiment of the present invention, a system includes a controller and one or more expanders in a SAS/SATA topology. Each of the controller and one or more expanders may include one or more DMD timers associated with devices directly connected to the controller or expander.

In another embodiment of the present invention, a method for tracking disconnected devices in a SAS/SATA topology includes starting a DMD timer in an expander when a device directly connected to the expander is disconnected from the expander. When the DMD timer expires, the expander may then modify the topology to reflect the disconnected device.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
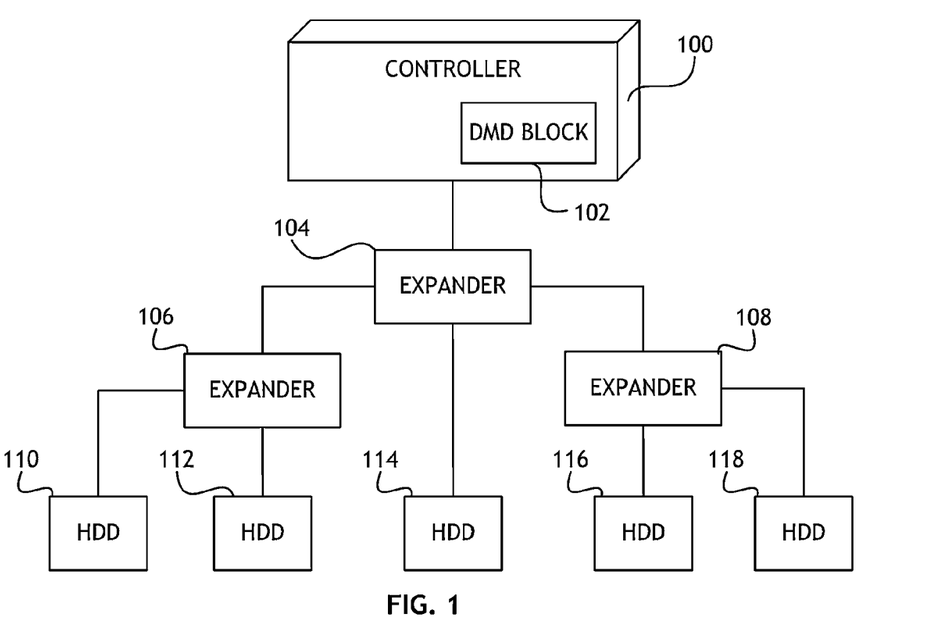
FIG. 1 shows a block diagram of a SAS topology having DMD timers.

Referring to FIG. 1, a block diagram of a SAS topology having DMD timers is shown. The topology may include a controller 100 with a memory block 102 reserved for DMD timers. The memory block 102 may include DMD timers for each element in the topology. Elements in the topology may include one or more expanders 104, 106, 108 and one or more hard disk drives (HDDs) 110, 112, 114, 116, 118. For example, the controller 100 may be directly connected to a first expander 104. The first expander 104 may be connected to a second expander 106 and a third expander 108. A first HDD 110 and second HDD 112 may be connected to the second expander 106; a third HDD 114 may be connected to the first expander 104; and a fourth HDD 116 and fifth HDD 118 may be connected to the third expander 108. The memory block 102 may include DMD timers for each of the expanders 104, 106, 108 and each of the HDDs 110, 112, 114, 116, 118.

Figure 2:
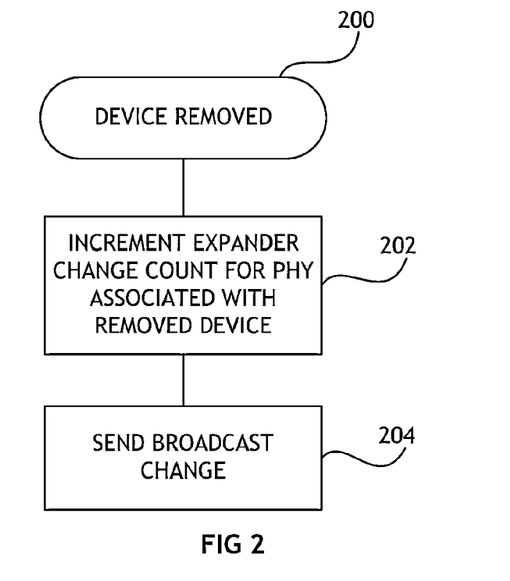
FIG. 2 shows a flowchart of expander behavior when a HDD is removed.

Referring to FIG. 2, a flowchart of expander behavior when a HDD is removed is shown. In a topology such as that shown in FIG. 1, the controller 100 tracks all DMD timers for every element in the topology. When a device is disconnected 200 (for example, one of the HDDs 110, 112, 114, 116, 118), the expander 104, 106, 108 connected to the removed device may identify the change and increment 202 a change counter associated with the PHY connected to the removed device. The expander 104, 106, 108 may then send 204 a signal to the controller 100 indicating that the device has been removed. The controller 100 may then start a DMD timer associated with the removed device (or the PHY associated with the removed device).

Figure 3:
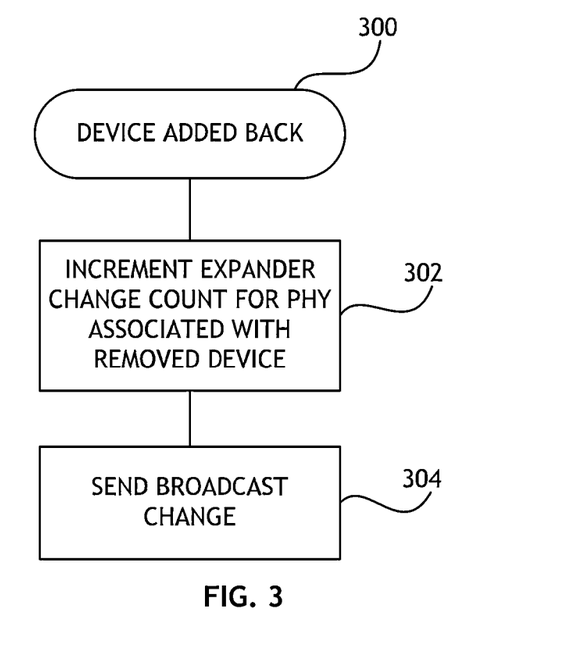
FIG. 3 shows a flowchart of expander behavior when a HDD is re-added within DMD.

Referring to FIG. 3, a flowchart of expander behavior when a HDD is re-added within DMD is shown. In a topology such as that shown in FIG. 1, when a disconnected device (for example, one of the HDDs 110, 112, 114, 116, 118) is added back 300, the expander 104, 106, 108 connected to the re-connected device may identify the change and increment 302 a change counter associated with the PHY connected to the re-connected device. The expander 104, 106, 108 may then send 304 a signal to the controller 100 indicating that the device has been added back. If the device is added back within the DMD, the controller 100 may stop the appropriate DMD timer; no further action may be necessary. If the device is not added back within the DMD timer, additional processing may be necessary for the controller 100 to re-configure the topology.

Figure 4:
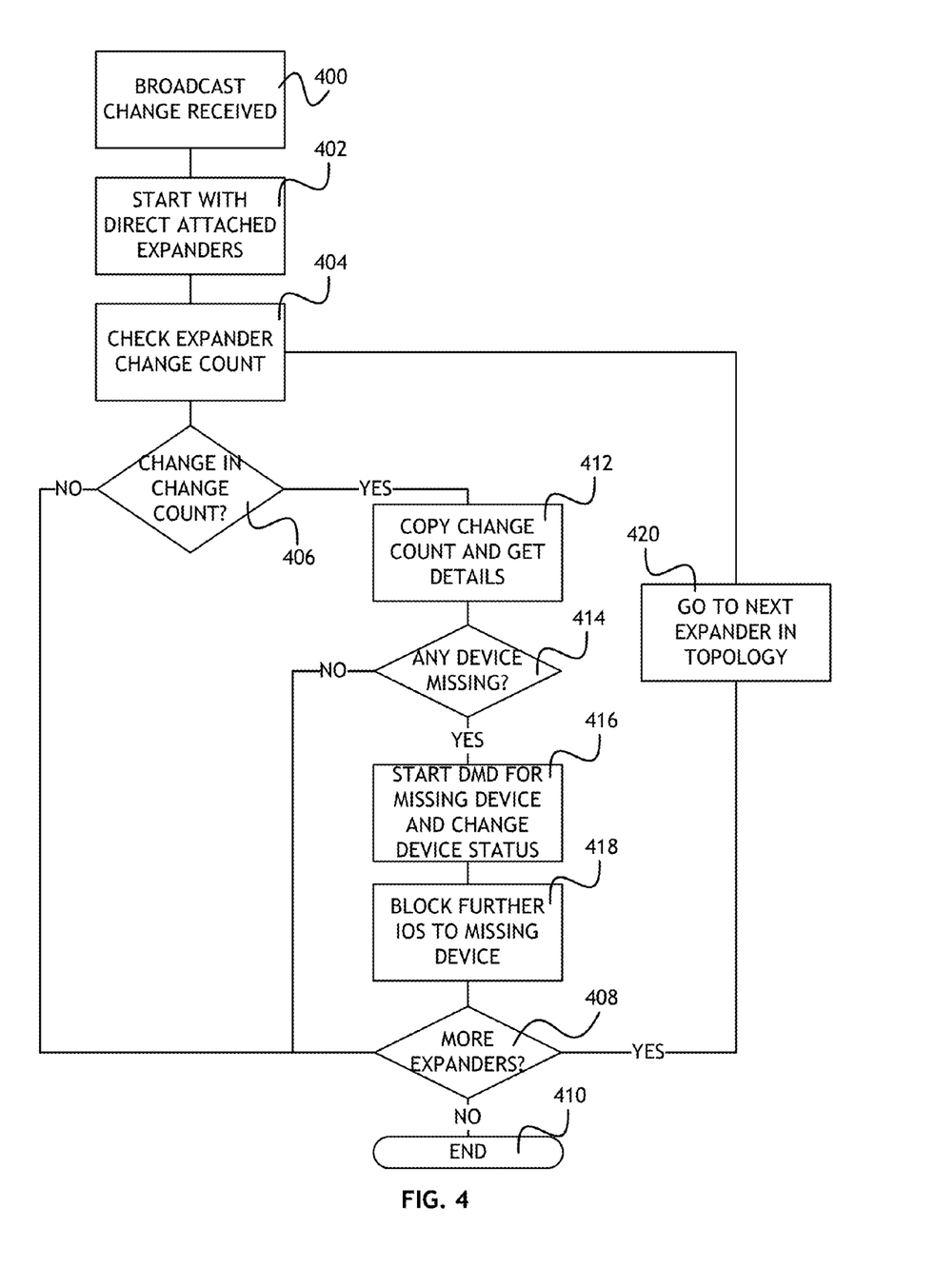
FIG. 4 shows a flowchart of controller behavior when a HDD is removed.

Referring to FIG. 4, a flowchart of controller behavior when a HDD is removed is shown. In a topology such as that shown in FIG. 1, when a controller 100 receives 400 a signal from an expander 104, 106, 108 indicating a change (for example, during the processes depicted in FIG. 2 and FIG. 3), the controller 100 may analyze all expanders 104, 106, 108 in the topology beginning 402 with expanders 104 directly connected to the controller 100. The controller 100 may check 404 the expander 104, 106, 108 change count for the expander 104, 106, 108 currently under analysis. The controller 100 may determine 404 if the expander 104, 106, 108 change count for the current expander 104, 106, 108 has changed since the last topology inspection. If the expander 104, 106, 108 change count has not changed, the controller 100 may determine 408 if there are additional expanders 104, 106, 108 in the topology. If there are no additional expanders 104, 106, 108, the process ends 410 and normally controller 100 activity may resume. If additional expanders 104, 106, 108 exist in the topology, the controller 100 may focus 420 on another expander 104, 106, 108 according to some algorithm such as relative proximity to the controller 100, and determine 404 if the expander 104, 106, 108 change count for the then current expander 104, 106, 108 has changed since the last topology inspection.

However, if the expander 104, 106, 108 change count has changed, the controller 100 may copy 412 the new change count and receive corresponding details from the expander. For example, the controller 100 may receive details associated with the nature of the change resulting in a new change count. Based on the details received form the then current expander 104, 106, 108, the controller 100 may determine 414 if a device is missing from the then current expander 104, 106, 108. If no device is missing from the then current expander 104, 106, 108, the controller may determine 408 if there are more expanders 104, 106, 108 in the topology and move 420 to the next expander 104, 106, 108.

If the controller 100 determines that device is missing from the then current expander 104, 106, 108, the controller 100 may start 416 a DMD timer associated with the missing device or the PHY on the current expander 104, 106, 108 associated with the missing device. The controller 100 may then block 418 further IOs to the missing device. The controller 100 may then determine 408 if there are additional expanders 104, 106, 108 in the topology and move on 420 to the next expander 104, 106, 108.

Figure 5:
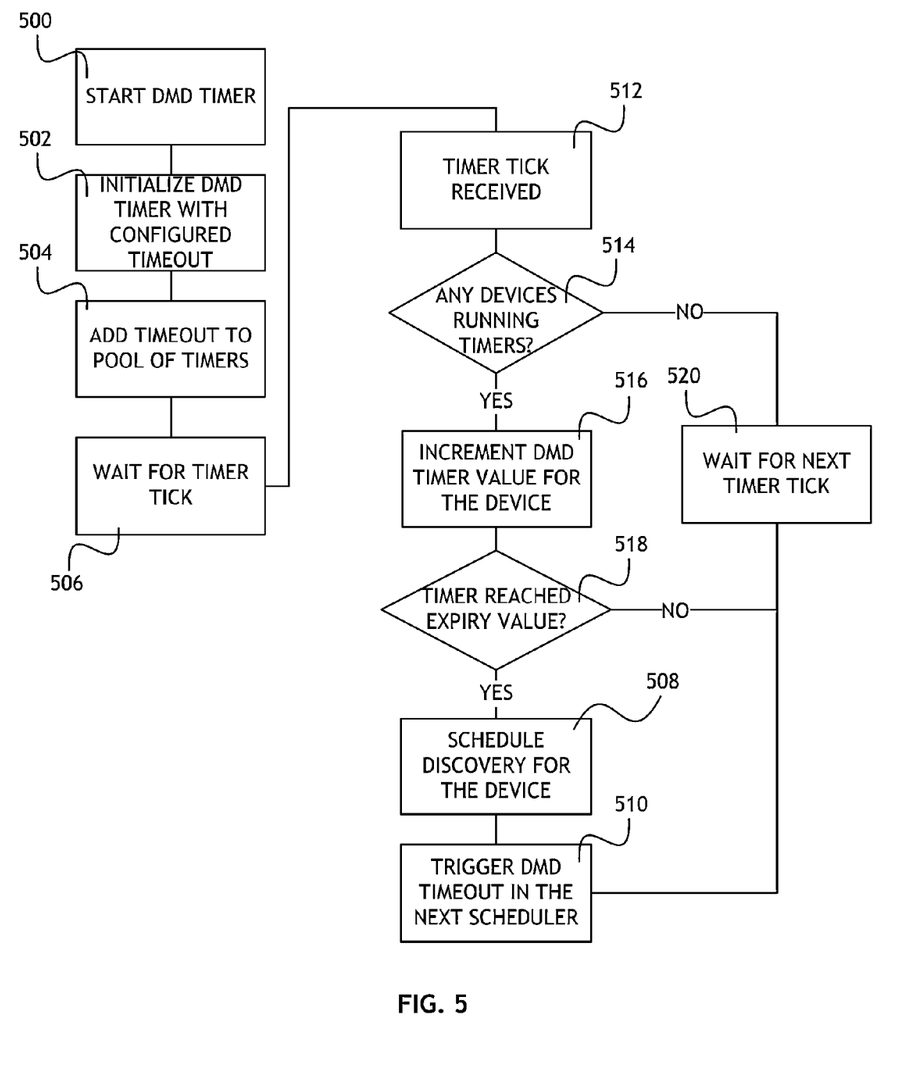
FIG. 5 shows a flowchart of controller behavior while DMD timer is executing.

Referring to FIG. 5, a flowchart of controller behavior while DMD timer is executing is shown. In a topology such as that shown in FIG. 1, when a device is removed from the topology, the controller 100 may receive a signal from the expander 104, 106, 108 and start 500 a DMD timer associated with the missing device. The controller 100 may initialize 502 the DMD timer with a configured timeout value and add 504 the DMD timer to a pool of DMD timers. Each DMD timer in the pool of DMD timers may be implemented as a data structure and each DMD timer may be stored in the memory block 102. The controller 100 may then wait 506 a predetermined duration. When the controller 100 receives 512 an indication that the predetermined duration has elapsed, the controller 100 may determine 514 if any DMD timers are currently running. If no DMD timers are running, the controller 100 may wait 520 for the next predetermined duration to elapse.

If the controller determined 514 that one or more DMD timers are running, the controller 100 may increment 516 each DMD timer (toward expiration). The controller 100 may then determine 518, for each DMD timer, if the DMD timer has expired. If the DMD timer has expired, the controller 100 may schedule 508 a discovery process for the missing device and trigger 510 a DMD timeout for during the next scheduler.

In a topology of sufficient size, a controller 100 may track so many DMD timers that the loop for checking 514, incrementing 516 and scheduling 508 consumes substantial system resources in the controller 100.

Figure 6:
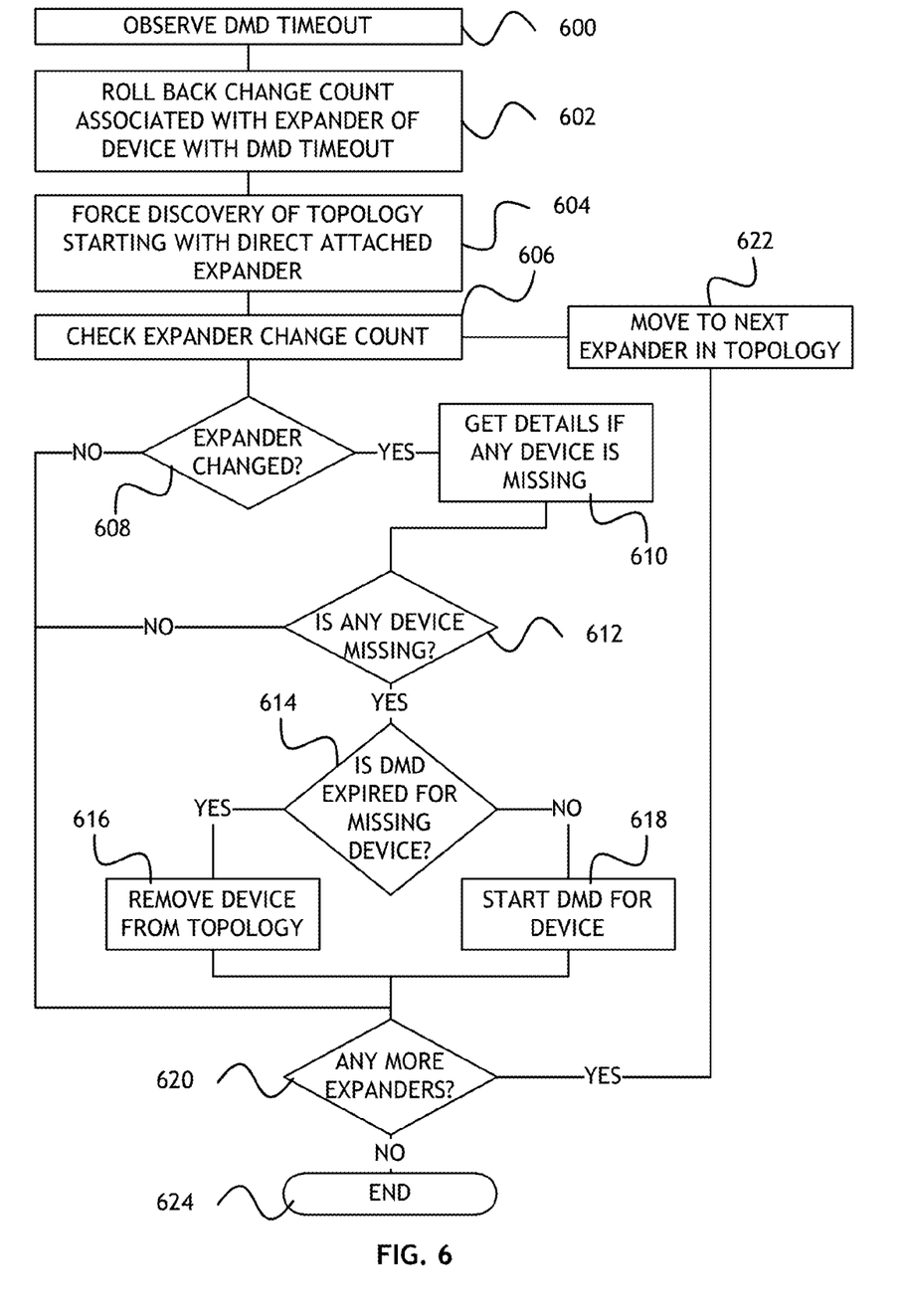
FIG. 6 shows a flowchart of controller behavior concerning DMD timers.

Referring to FIG. 6, a flowchart of controller behavior concerning DMD timers is shown. In a topology such as that shown in FIG. 1, when a DMD timer expires, a controller 100 may observer 600 the DMD timeout and rollback 602 the change count associated with the expander 104, 106, 108 associated with the missing device. The controller 100 may then force 604 discovery of the entire topology starting with expanders 104 directly attached to the controller 100.

For each expander 104, 106, 108 in the topology, the controller 100 may check 606 the expander 104, 106, 108 change count. If the controller 100 determines 608 that the current expander 104, 106, 108 has not changed, the controller 100 may determine 620 if there are any additional expanders in the topology; if there are additional expanders 104, 106, 108, the controller 100 may move on 622 to the next expander 104, 106, 108 in the topology.

If the controller 100 determines 608 that the current expander 104, 106, 108 has changed, the controller 100 may receive 610 details associated with the missing device. The controller 100 may then determine 612 if any device connected to the current expander 104, 106, 108 is missing. If the controller 100 determines 612 that the current expander 104, 106, 108 has no missing devices, the controller 100 may determine 620 if there are any additional expanders in the topology; if there are additional expanders 104, 106, 108, the controller 100 may move on 622 to the next expander 104, 106, 108 in the topology.

If the controller 100 determines 612 that a device connected to the current expander 104, 106, 108 is missing, the controller 100 may determine 614 a DMD timer associated with the missing device has expired. If the controller 100 determines 614 that the DMD timer has expired, the controller 100 may remove 616 the missing device from the topology. If the controller 100 determines 614 that the DMD timer has not expired, the controller 100 may start 618 a DMD timer associated with the missing device. In some circumstances, such as when more than one device goes missing from a single expander 104, 106, 108, the controller 100 may enter a loop where DMD timers are re-started instead of expiring.

Figure 7:
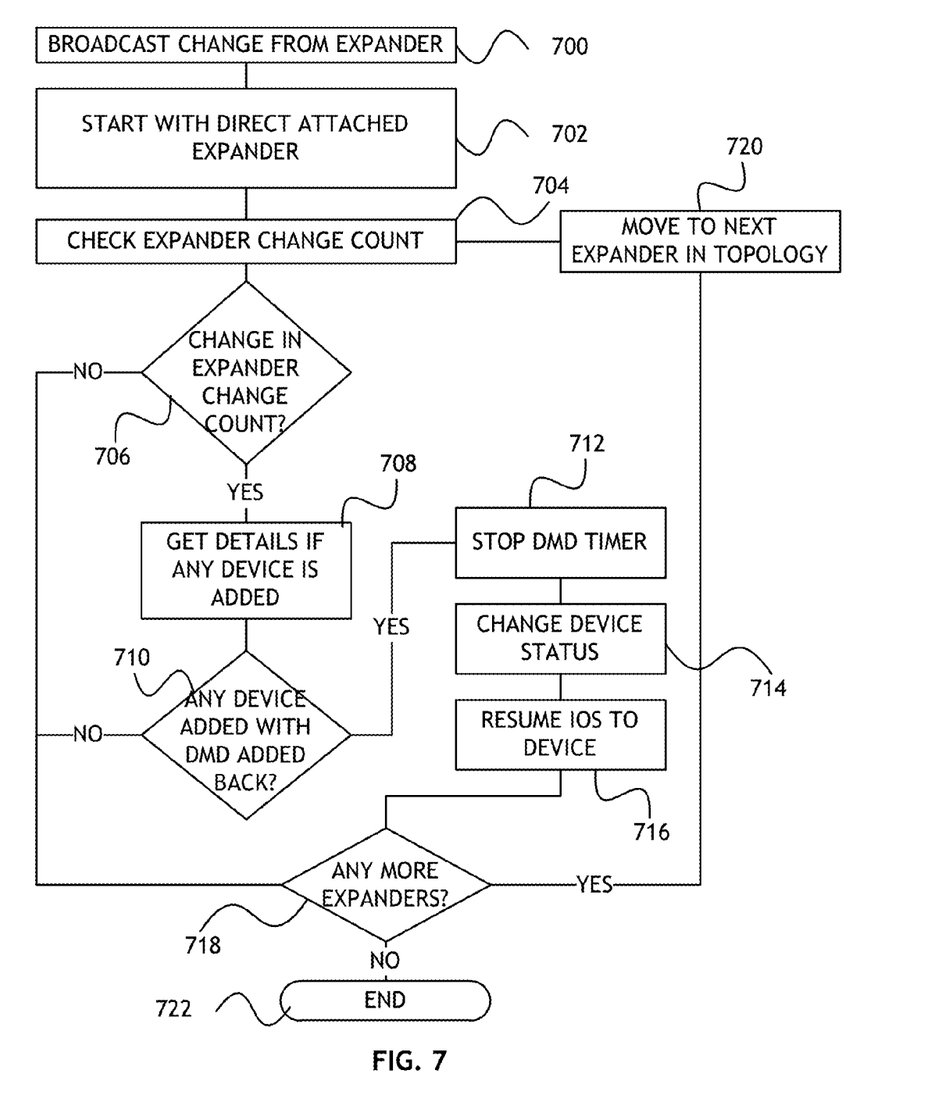
FIG. 7 shows a flowchart of controller behavior concerning expander signaling.

Referring to FIG. 7, a flowchart of controller behavior concerning expander signaling is shown. In a topology such as that shown in FIG. 1, when a missing device is added back before an associated DMD timer expires, a controller 100 may receive 700 a broadcast change from an expander 104, 160, 108. The controller 100 may then check 704 the expander 104, 106, 108 change count starting 702 with expanders 104 directly attached to the controller 100.

For each expander 104, 106, 108 in the topology, the controller 100 may determine 706 if the current expander 104, 106, 108 change count has changed; if not, the controller 100 may determine 718 if there are any additional expanders in the topology; if there are additional expanders 104, 106, 108, the controller 100 may move on 720 to the next expander 104, 106, 108 in the topology.

If the controller 100 determines 706 that the current expander 104, 106, 108 change count has changed, the controller 100 may receive 708 details associated with any added devices. The controller 100 may then determine 710 if any device was added to the current expander 104, 106, 108. If the controller 100 determines 710 that the current expander 104, 106, 108 has no added devices, the controller 100 may determine 718 if there are any additional expanders in the topology; if there are additional expanders 104, 106, 108, the controller 100 may move on 720 to the next expander 104, 106, 108 in the topology.

If the controller 100 determines 710 that a device has been connected to the current expander 104, 106, 108, and the added device is associated with a running DMD timer, the controller 100 may stop 712 the DMD timer associated with the added device if a DMD timer is running, change 714 the status of the device and resume 716 sending IOs to the added device.

Figure 8:
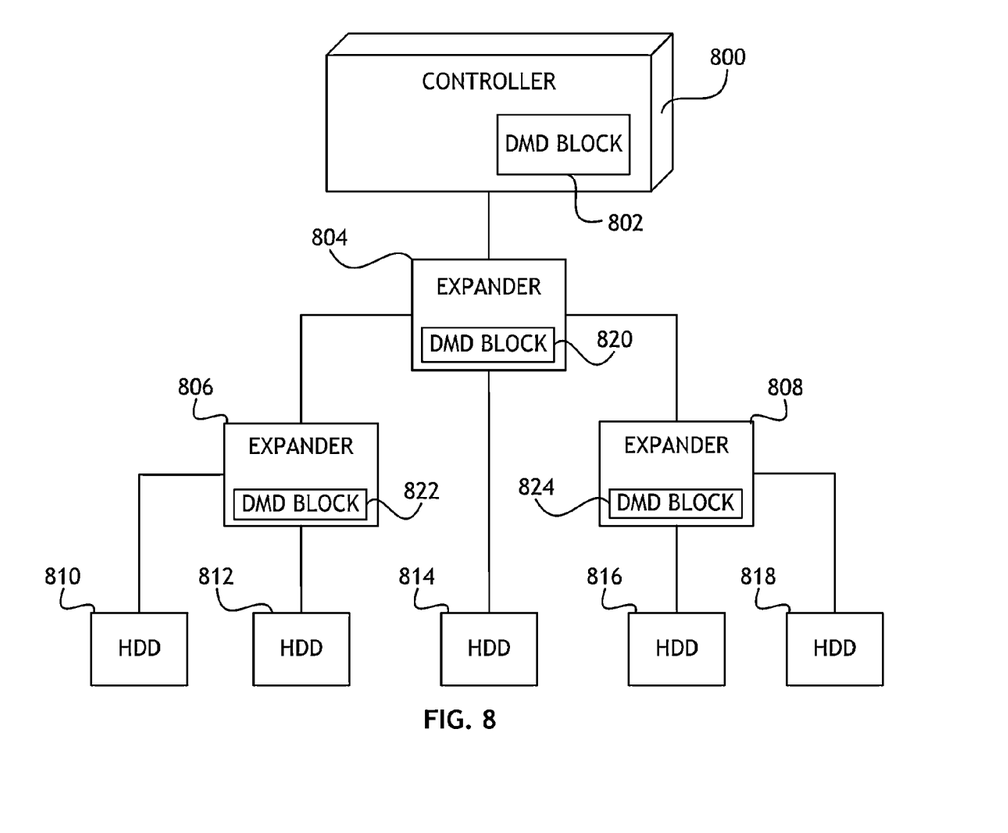
FIG. 8 shows a block diagram of a SAS topology having expanders with DMD timers.

Referring to FIG. 8, a block diagram of a SAS topology having expanders with DMD timers is shown. The topology may include a controller 800 with a memory block 802 reserved for DMD timers. The memory block 802 may include DMD timers for each element directly attached to the controller 800. Elements in the topology may include one or more expanders 804, 806, 808 and one or more hard disk drives (HDDs) 810, 812, 814, 816, 818. For example, the controller 800 may be directly connected to a first expander 804. The first expander 804 may be connected to a second expander 806 and a third expander 808. A first HDD 810 and second HDD 812 may be connected to the second expander 806; a third HDD 814 may be connected to the first expander 804; and a fourth HDD 816 and fifth HDD 818 may be connected to the third expander 808. The memory block 802 may include DMD timers for each directly attached device; in this case the controller 800 memory block 802 may include a DMD timer for the first expander 804.

Each expander 804, 806, 808 may include a memory block 820, 822, 824 reserved for DMD timers associated with devices directly connected to the corresponding expander 804, 806, 808. For example, a first expander 804 may include a memory block 820 for storing a DMD timer associated with the third HDD 814 or the PHY in the first expander 804 associated with the third HDD 814, a DMD timer associated with the second expander 806 or the PHY in the first expander 804 associated with the second expander 806, and a DMD timer associated with the third expander 808 or the PHY in the first expander 804 associated with the third expander 808; a second expander 806 may include a memory block 822 for storing a DMD timer associated with the first and second HDDs 810, 812 or the PHYs in the second expander 806 associated with the first and second HDDs 810, 812; and a third expander 808 may include a memory block 824 for storing a DMD timer associated with the fourth and fifth HDDs 816, 818 or the PHYs in the third expander 808 associated with the fourth and fifth HDDs 816, 818.

Figure 9:
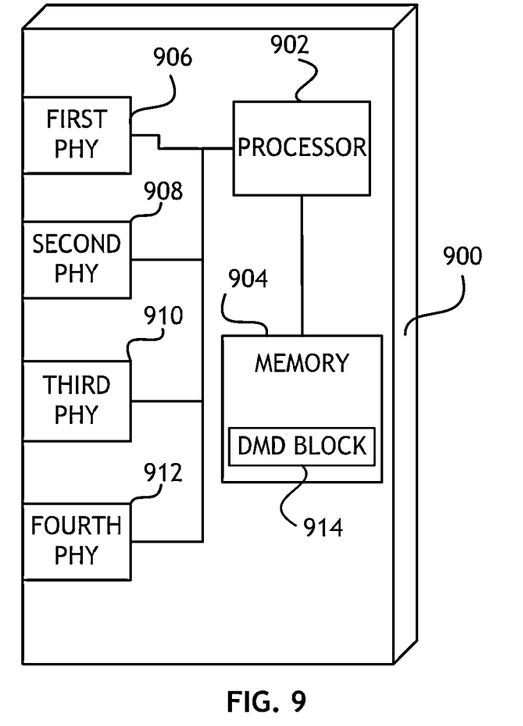
FIG. 9 shows a block diagram of a SAS expander having DMD timers.

Referring to FIG. 9, a block diagram of a SAS expander 900 having DMD timers is shown. The expander 900 may include a processor 902, a plurality of PHYs 906, 908, 910, 912 connected to the processor, and a memory 904. The memory 904 may include a DMD block 914 for storing data structures capable of tracking time intervals when a device connected to one of the PHYs 906, 908, 910, 912 becomes disconnected. The processor 902 may send and receive signals indicating when a device connected to one or more of the PHYs 906, 908, 910, 912 becomes disconnected. The processor 902 may also send and receive details pertaining to the disconnected devices or associated PHYs 906, 908, 910, 912. The processor 902 may keep track of changes in a change count data structure stored in the memory 904.

Figure 10:
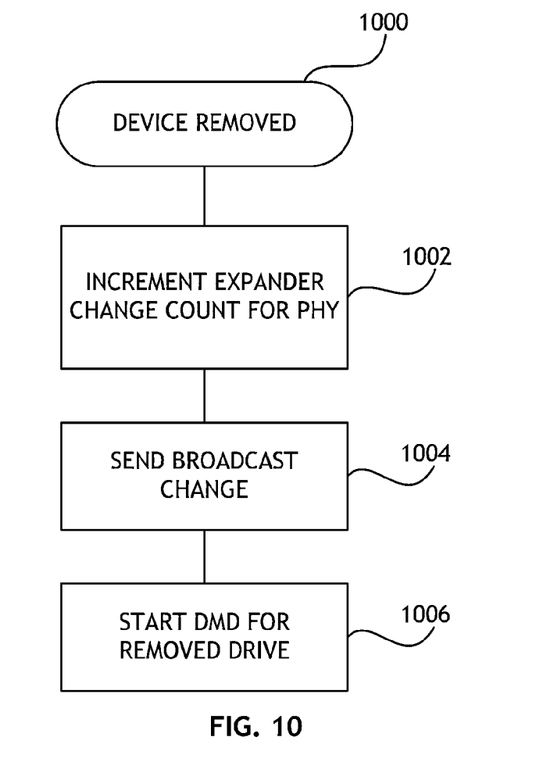
FIG. 10 shows a flowchart of expander behavior according to one embodiment of the present invention when a HDD is removed.

Referring to FIG. 10, a flowchart of expander behavior according to one embodiment of the present invention when a HDD is removed is shown. An expander such as shown in FIG. 9 may include DMD timers associated with each PHY 906, 908, 910, 912. When a device is disconnected 1000 from one of the PHYs 906, 908, 910, 912, the expander 900 may increment 1002 a change counter associated with the PHY 906, 908, 910, 912 connected to the removed device. The expander 900 may then send 1004 a signal to a controller indicating that the device has been removed. The expander 900 may then start 1006 a DMD timer associated with the PHY 906, 908, 910, 912 associated with the removed device.

Figure 11:
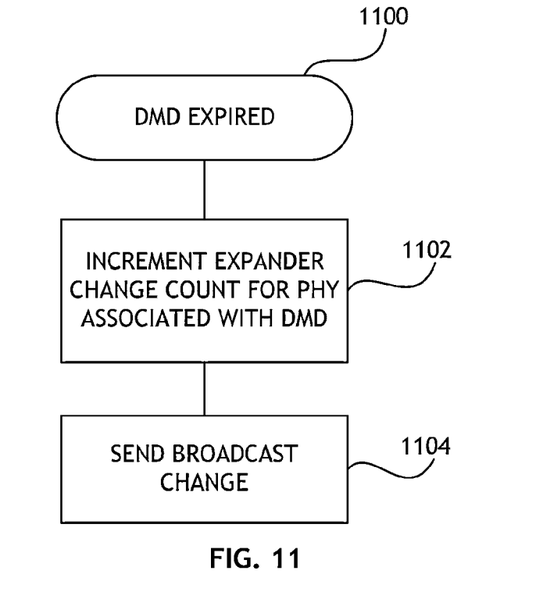
FIG. 11 shows a flowchart of expander behavior according to the present invention when a DMD timer expires.

Referring to FIG. 11, a flowchart of expander behavior according to the present invention when a DMD timer expires is shown. Where an expander, such as shown in FIG. 9, includes DMD timers associated with each PHY 906, 908, 910, 912, the expander 900 may start a DMD timer when a device becomes disconnected from one of the PHYs 906, 908, 910, 912. When a DMD timer expires 1100, the expander 900 may increment 1102 a change counter associated with the PHY 906, 908, 910, 912 connected to the removed device. The expander 900 may then send 1104 a signal to a controller indicating that the device has been removed.

Figure 12:
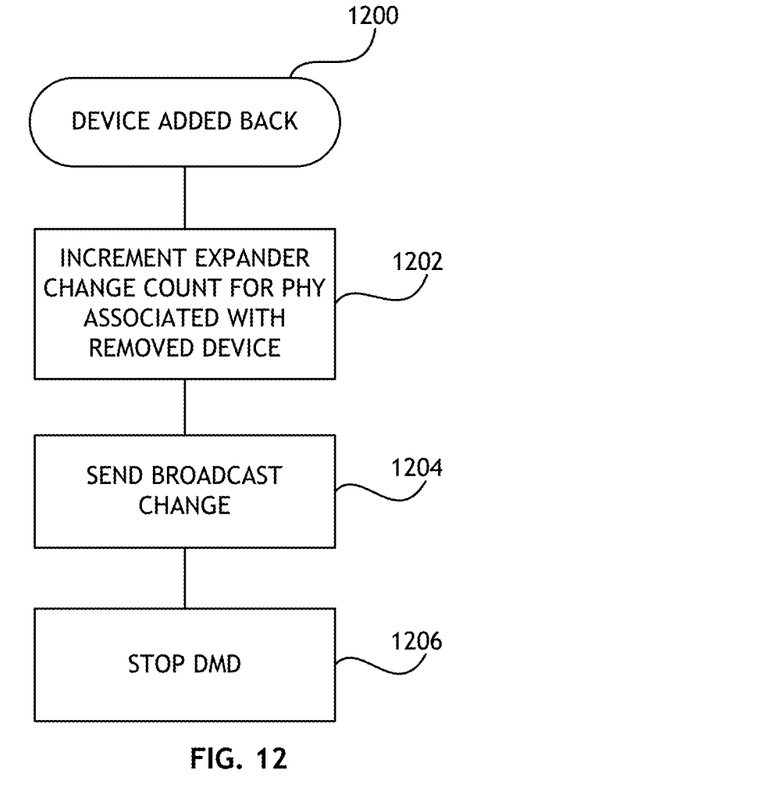
FIG. 12 shows a flowchart of expander behavior according to the present invention when a HDD is re-added within DMD.

Referring to FIG. 12, a flowchart of expander behavior according to the present invention when a HDD is re-added within DMD is shown. Where an expander, such as shown in FIG. 9, includes DMD timers associated with each PHY 906, 908, 910, 912, the expander 900 may start a DMD timer when a device becomes disconnected from one of the PHYs 906, 908, 910, 912. When the disconnected device is added back before the DMD timer expires 1200, the expander 900 may increment 1202 a change counter associated with the PHY 906, 908, 910, 912 connected to the removed device. The expander 900 may then send 1204 a signal to a controller indicating that the device has been re-added and stop 1206 the DMD timer.

By the methods shown in FIG. 10, FIG. 11 and FIG. 12, the processing involved in monitoring DMD timers may be transferred to the expander directly connected to a disconnected device instead of the controller for the topology.

Figure 13:
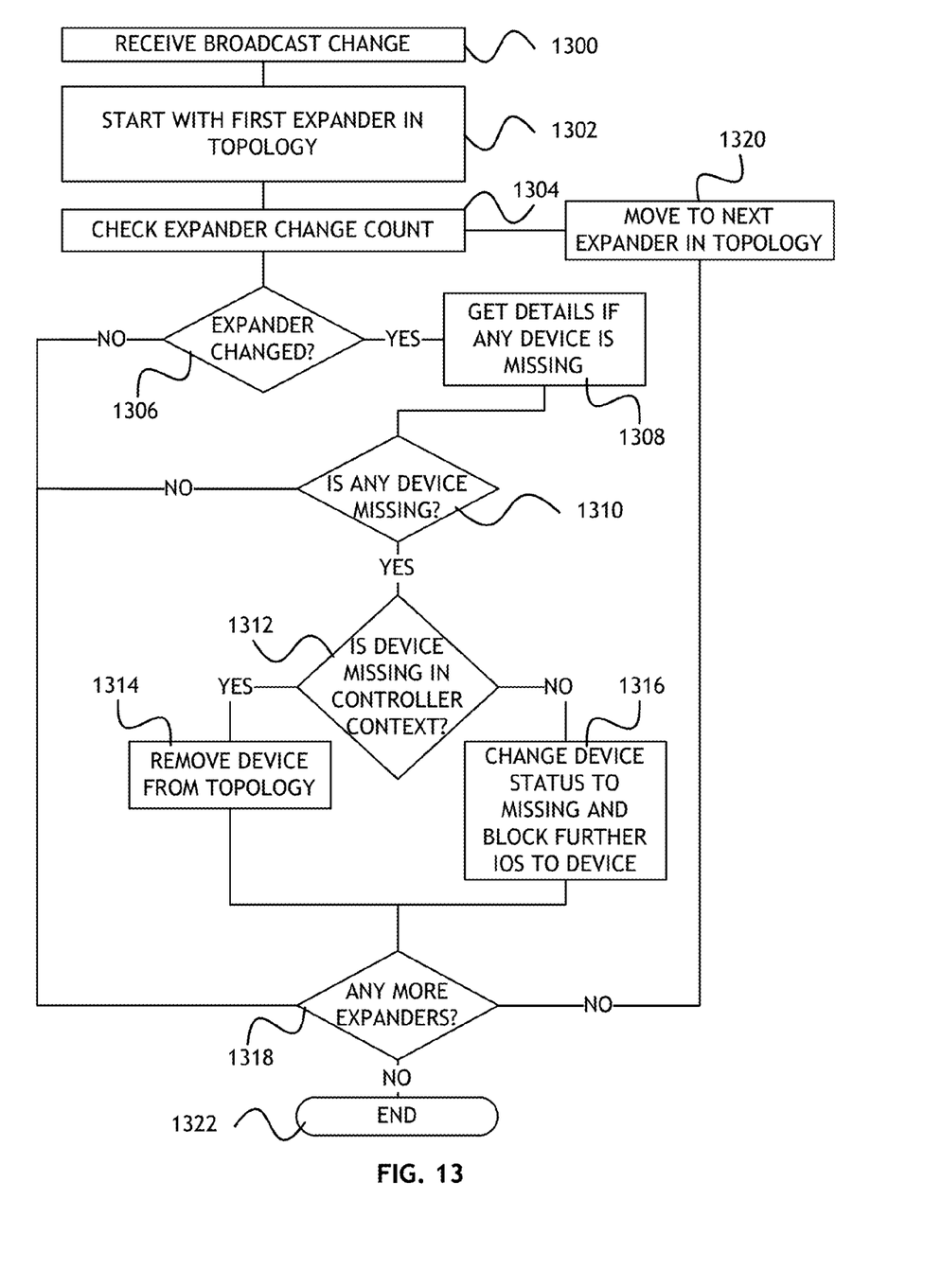
FIG. 13 shows a flowchart of controller behavior according to the present invention concerning DMD timers.

Referring to FIG. 13, a flowchart of controller behavior according to the present invention concerning DMD timers is shown. When an expander such as shown in FIG. 9 sends a signal to a controller such as set forth in FIG. 10 or FIG. 11, indicating that a device has been removed or a DMD timer has expired, the controller may receive 1300 such signal. Starting 1302 with directly connected expanders, the controller may check 1304 the change count of the current expander. If the controller determines 1306 that the expander has not changed, the controller may determine 1318 if there are other expanders in the topology; if not, then the process is concluded 1322; if so, the controller may move 1320 to the next expander in the topology and check 1304 the expander change count.

If the controller determines 1306 that the expander has changed, the controller may receive 1308 details pertaining to any missing device in the expander. The controller may then determine 1310 if any device is missing. If no device is missing, the controller may determine 1318 if there are other expanders and proceed accordingly. If the controller determines 1310 a device is missing, the controller may determine 1312 if the device is already missing in the context of the controller. If the device is already missing, then the controller may remove 1314 the device from the topology and perform whatever processes are necessary to compensate for such removal. If the device is not already missing within the context of the controller, the controller may change the status of the device to "missing" and block further IOs to the missing device. In either case, the controller may then determine 1318 if there are other expanders in the topology; if not, then the process is concluded 1322; if so, the controller may move 1320 to the next expander in the topology and check 1304 the expander change count.

This method may remove the potentiality for loops wherein the controller resets a DMD timer because the controller no longer manages the DMD timers. Furthermore, the process of querying every expander in the topology is streamlined.

Figure 14:
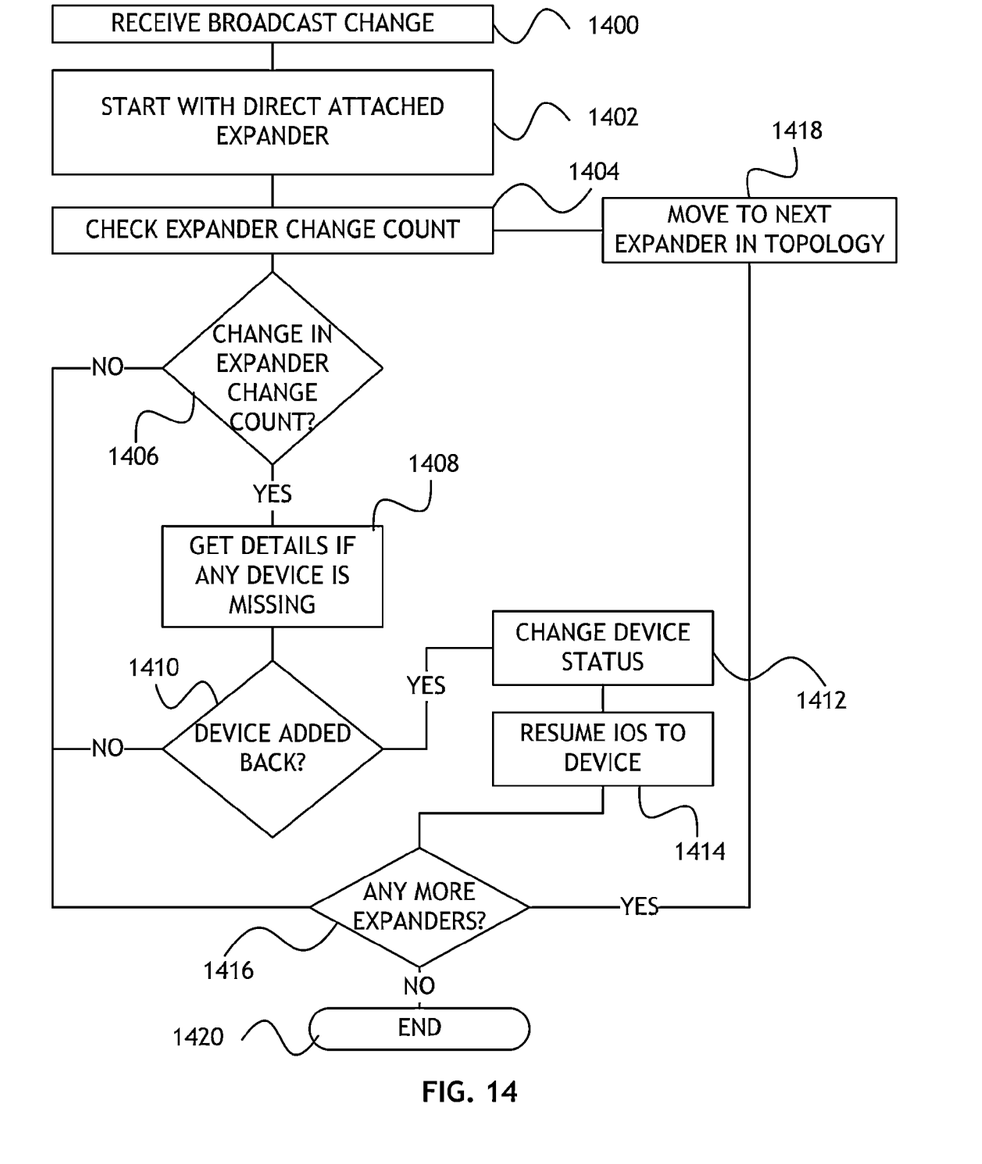
FIG. 14 shows a flowchart of controller behavior according to the present invention concerning expander signaling.

Referring to FIG. 14, a flowchart of controller behavior according to the present invention concerning expander signaling is shown. When an expander such as shown in FIG. 9 sends a signal to a controller such as set forth in FIG. 12, indicating that a device has been added back within the time period established by a DMD timer, the controller may receive 1400 such signal. Starting 1402 with directly connected expanders, the controller may check 1404 the change count of the current expander. If the controller determines 1406 that the expander has not changed, the controller may determine 1416 if there are other expanders in the topology; if not, then the process is concluded 1420; if so, the controller may move 1418 to the next expander in the topology and check 1404 the expander change count.

If the controller determines 1406 that the expander has changed, the controller may receive 1408 details pertaining to any missing device in the expander. The controller may then determine 1410 if the device has been added back. If the device has been added back, the controller may change 1412 the status of the device from "missing" to "present" and resume 1414 sending IOs to the device. The controller may then determine 1416 if there are other expanders in the topology; if not, then the process is concluded 1420; if so, the controller may move 1418 to the next expander in the topology and check 1404 the expander change count.

If the device has not been added back, the controller may determine 1416 if there are other expanders in the topology; if not, then the process is concluded 1420; if so, the controller may move 1418 to the next expander in the topology and check 1404 the expander change count.

This method may remove the potentiality for loops wherein the controller resets a DMD timer because the controller no longer manages the DMD timers. Furthermore, the process of querying every expander in the topology is streamlined.

Figure 15:
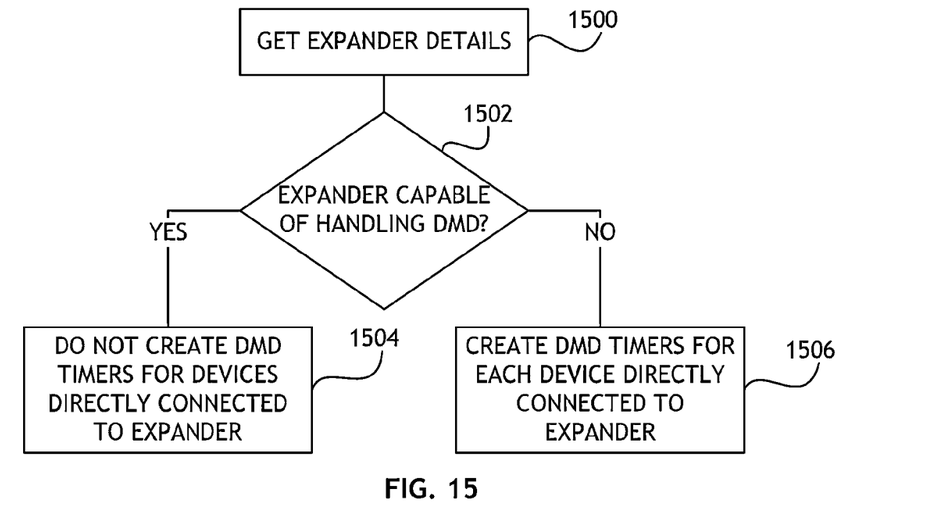
FIG. 15 shows a flowchart of controller behavior according to the present invention for compatibility in a topology including prior art expanders and expanders according to the present invention.

Referring to FIG. 15, a flowchart of controller behavior according to the present invention for compatibility in a topology including prior art expanders and expanders according to the present invention is shown. A controller may query each expander in a topology get details 1500 from each expander. Such details may include the ability of the expander to handle DMD timers. The controller may then determine 1502, based on those details, if an expander is capable of handling DMD timers. If the expander can handle DMD timers, the controller may refrain 1504 from creating DMD timers for any devices directly connected that expander. If the expander is not capable of handling DMD timers, the controller may create 1506 DMD timers for each device directly connected to that expander. By this methodology, a controller may operate a topology including both prior art expanders and expanders according to the present invention.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system comprising:
   a controller comprising:
   a processor;
   memory connected to the processor; and
   computer executable program code configured to execute on the processor,
   wherein:
   the controller memory is configured to store one or more Device Missing Delay timers;
   the computer executable program code is configured to:
   identify at least one Device Missing Delay incompatible SAS/SATA expander that is not capable of tracking Device Missing Delay timers for devices directly connected to the Device Missing Delay incompatible SAS/SATA expander;
   instantiate at least one Device Missing Delay timer associated with at least one device directly connected to the Device Missing Delay incompatible SAS/SATA expander;
   identify at least one device missing delay compatible SAS/SATA expander that is capable of tracking Device Missing Delay timers for devices directly connected to the Device Missing Delay incompatible SAS/SATA expander;
   prevent instantiation of Device Missing Delay timers associated devices directly connected to the Device Missing Delay compatible SAS/SATA expander; and
   receive signals form at least one expander indicating when a Device Missing Delay timer has expired; and
   at least one SAS/SATA expander comprising:
   a processor;
   memory connected to the processor;
   one or more PHYs connected to the processor; and
   computer executable program code configured to execute on the processor,
   wherein:

the expander memory is configured to store one or more Device Missing Delay timers; and the computer executable program code is configured to:

determining that a device has become disconnected from one or more of the one or more PHYs;

start a Device Missing Delay timer associated with the at least one of the one or more PHYs associated with the disconnected device; and maintain a representation of a current network topology while at least one of the one or more device missing delay timers is running.

2. The system of claim 1, wherein the SAS/SATA expander computer executable program code is further configured to increment an expander change count.

3. The system of claim 1, wherein:

the SAS/SATA expander computer executable program code is further configured to: determine that the Device Missing Delay timer has expired; and signal the controller that the Device Missing Delay timer has expired; and the controller computer executable program code is further configured to remove the device that has become disconnected from a topology.

4. The system of claim 3, wherein the SAS/SATA expander computer executable program code is further configured to increment an expander change count.

5. The system of claim 1, wherein the controller computer executable program code is further configured to block IOs to the device that has become disconnected.

6. The system of claim 1, wherein:

the SAS/SATA expander computer executable program code is further configured to:

determining that the device has been reconnected to the SAS/SATA expander within a time period defined by the Device Missing Delay timer; and signal the controller that the device has been reconnected to the SAS/SATA expander; and the controller computer executable program code is further configured to resume sending IOs to the device.

7. The system of claim 6, wherein the SAS/SATA expander computer executable program code is further configured to increment an expander change count.

8. The system of claim 1, wherein the SAS/SATA expander computer executable program code is further configured to increment an expander change count.

* * * * *